US006683719B2

(12) United States Patent
Hagenbach et al.

(10) Patent No.: US 6,683,719 B2
(45) Date of Patent: Jan. 27, 2004

(54) LIGHT DIFFUSER

(75) Inventors: Uwe Hagenbach, Eichenried (DE); Bernhard Grill, Seeshaupt (DE)

(73) Assignee: Licht-Technik Vertriebs GmbH, Munich (DE)

( * ) Notice: Subject to any disclaimer, the term of this patent is extended or adjusted under 35 U.S.C. 154(b) by 0 days.

(21) Appl. No.: 10/048,724

(22) PCT Filed: May 29, 2001

(86) PCT No.: PCT/EP01/06117

§ 371 (c)(1), (2), (4) Date: Jun. 5, 2002

(87) PCT Pub. No.: WO01/92779

PCT Pub. Date: Dec. 6, 2001

(65) Prior Publication Data

US 2002/0191295 A1 Dec. 19, 2002

(30) Foreign Application Priority Data

May 29, 2000 (DE) .......................................... 100 26 594

(51) Int. Cl.[7] ............................ G02B 13/20; G02B 5/02

(52) U.S. Cl. ......................... 359/599; 362/96; 362/352; 362/267; 362/16; 362/355

(58) Field of Search .......................... 362/96, 267, 310, 362/351, 352, 16, 311, 355, 450, 189; 359/599, 896

(56) References Cited

U.S. PATENT DOCUMENTS 4,855,874 A * 8/1989 Waltz .......................... 362/16
5,117,344 A * 5/1992 Perez .......................... 362/352
5,683,167 A 11/1997 Tarlow
6,012,826 A * 1/2000 Chabert ...................... 362/363

FOREIGN PATENT DOCUMENTS

| | | | |
|---|---|---|---|
| CA | 2339926 | * | 3/2000 |
| DE | 195 29 648 A1 | | 3/1997 |
| EP | 834 693 A1 | | 12/1974 |
| GB | 2260394 A | * | 4/1993 |
| WO | wo 00/16005 | | 3/2000 |

* cited by examiner

*Primary Examiner*—Drew Dunn
*Assistant Examiner*—Leo Boutsikaris
(74) *Attorney, Agent, or Firm*—James J. Murphy; Winstead Sechrest & Minick P.C.

(57) ABSTRACT

A light diffuser, consisting of a holding mechanism and, releasably connected thereto, an inflatable sack that is at least partially translucent. The holding mechanism comprises an adapter ring that at one end serves for attachment to a spotlight and at the other end as a receptable of the sack. The adapter ring is closed off at the attachment end so as to be translucent and pressure sealed. At the holding mechanism means are provided for supply of a gaseous filling medium. Arranged at the adapter ring are a compressed-gas connection and an electronically actuatable valve for the gas supply, such that a first pressure sensor determines the increasing of pressure within the sack fixed to the ring and sends a switch-off signal to the valve when a preset maximal pressure value has been reached, in order to terminate or interrupt filling automatically.

14 Claims, 1 Drawing Sheet

LIGHT DIFFUSER

DESCRIPTION

Figure 1:
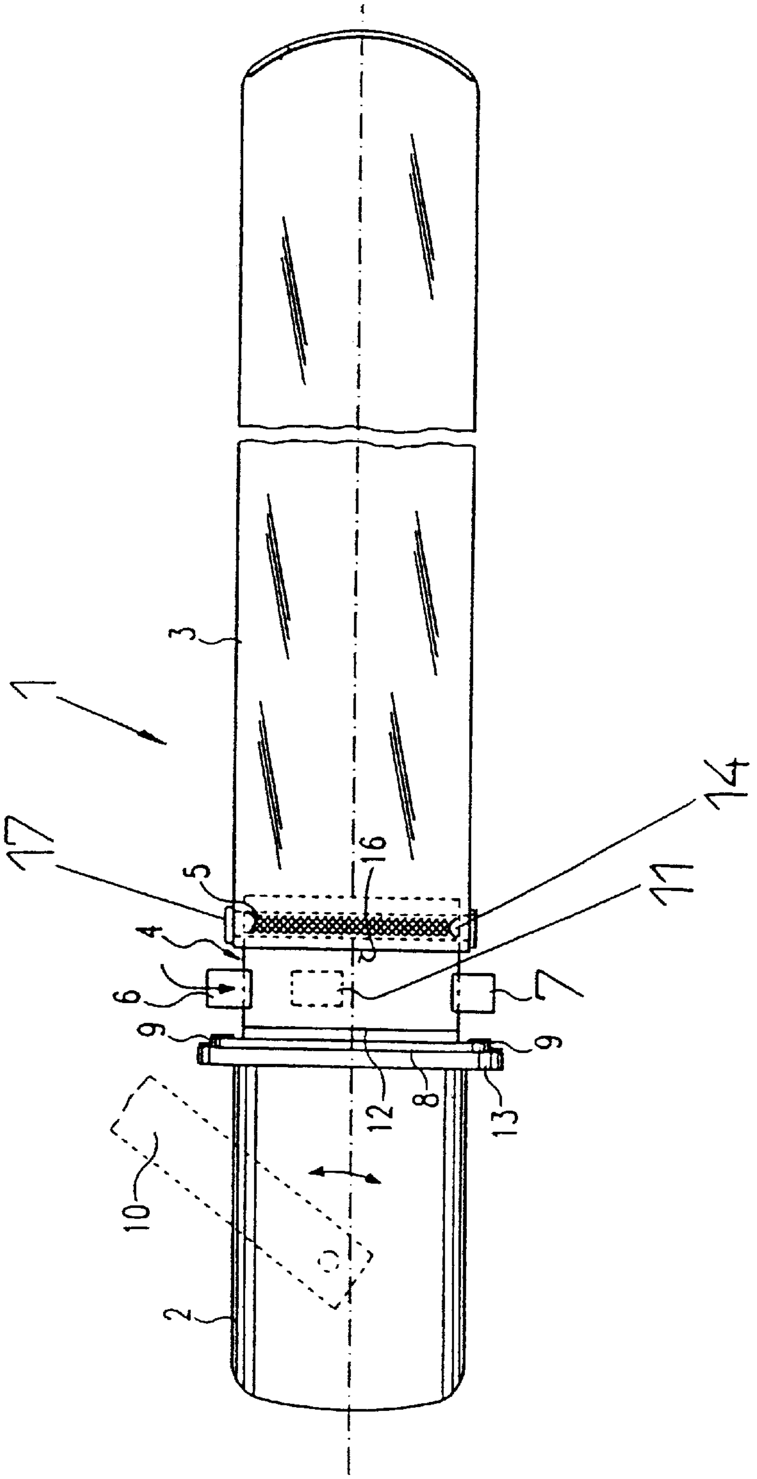

The object of the invention follows from the above, namely to improve a light diffuser consisting of a holding mechanism and an inflatable, at least partially air-permeable sack releasably connected thereto, in such a way that the sack can be optimized and reliably filled even by people not specially trained to do so. In addition, the whole system comprising this light diffuser should be designed in a pressure sealed way that it can be in use for a relatively long time without needing to be refilled or replenished, in particular during film and television photography.

This object is solved with the characteristics given in claim 1, whereas the dependent claims comprise at least advantageous embodiments and developments.

Accordingly, the basic idea of the invention is to provide the holding mechanism, which is designed as an adapter ring, with a compressed-gas connection as well as an electronically actuatable valve leading to the gas supply, such that a first pressure sensor determines the progressively increasing pressure within the sack, which is fixed to the ring, and sends out a switch-off signal when an adjustable or predeterminable maximal pressure has been reached, so that inflation of the sack is automatically terminated regardless of whether or not, and to what extent, a key button to actuate the valve is still active.

The key button can, as mentioned, be activated manually to fill the sack with gas or replenish its contents, in which case the invention ensures that it will be turned off automatically. Furthermore, the invention also encompasses a remote control of the key-button actuation by way of an infrared interface in combination with a commercially available, appropriately programmable infrared transmission unit.

In another preferred embodiment of the invention a second sensor is provided to determine the ambient pressure, so that a switch-off signal can be derived on the basis of a predeterminable difference between the internal pressure and the external, i.e. atmospheric pressure. This embodiment offers in particular the advantage that there is no need to correct the maximal pressure level, in particular when the photography is being done at altitudes different from sea level. That is, it has proved to be the case that even relatively low filling pressures suffice to stretch the inflated sack tight, and higher pressures bring no additional advantages, but rather involve an increased risk of accidents. Because light diffusers of the kind described here are fundamentally applicable for mobile use and are used in quite different places, the automatic valve switch-off and pressure control based on differential pressure values is particullary advantageous.

Furthermore, an additional compressed-gas connection can be provided at the adapter ring in order to connect several light diffusers in series, so that only one central gas supply is needed and the filling gas can be looped through them in analogy to the electrical supply of an associated electrical spotlight.

The compressed-gas connection or connections can be joined by way of flexible pressure tubing to a compressor or compressed gas accumulator tank situated some distance away.

So that the preferably air-filled sacks can be rapidly emptied, a compressor can be switched from pressuregenerating to suction operation. By this means, when the illuminating devices are being dismantled or rearranged, time and hence expense can advantageously be saved.

As mentioned, the compressed-gas connections can also lead to a compressed-gas accumulator tank. In this case there is no need to employ an on-site compressor, especially under difficult local conditions.

To further improve the rapid emptying of the air sacks, there can be provided at or in them an exhaust valve with a large opening cross section.

To improve the sealing of the sack receptacle at the adapter ring, the adapter ring in a region towards the sack comprises circumferential beads with protrusions and recesses that serve to fix in position a profiled seal with corresponding surface structures. The profiled seal is then shifted over the free end of the adapter ring. The sack is subsequently attached with its opening side over the profiled seal and a retaining ring or strap is fixed around the adapter ring so that it produces a tight pressure seal but is nevertheless readily releasable.

In the following the invention is explained with reference to an exemplary embodiment, the description of which is assisted by a schematic drawing.

The light diffuser 1, completed with a spotlight 2, comprises an air sack 3 and a holding mechanism 4 in the nature of an adapter ring, which is disposed between the spotlight 2 and the sack 3. The holding mechanism 4 can be attached to the spotlight 2 by way of a flange-like shoulder 8, retaining strips 9 and a ring 13. The spotlight 2 itself is pivotably fixed to a stand (not shown) by way of a holder 10.

A translucent disk 12 is pressure sealed fixed within the adapter ring 4 in a pressure sealed manner, so that when the sack is mounted a corresponding airtight space is formed.

At the adapter ring 4 is a compressed-gas connection 6 with an electronically actuatable valve for the gas supply is arranged.

The increasing internal pressure at the mounted sack is determined by the first sensor 7 and a switch-off signal is sent to the electronic valve, of a preset maximum pressure value is reached.

A second sensor 11 serves to detect the ambient pressure, so that a shut-off signal can be derived on the basis of a difference value between the internal and external pressures.

The electronic switching valve, which can be constructed in combination with the compressed-gas connection 6, can be activated manually by way of a key button (not shown) in order to fill the sack with gas or replenish its contents.

On the side 16 of the adapter ring 4, to which the sack is connected, there is formed at least one circumferential bead 14 that engages a correspondingly shaped profiled seal 5. Then the sack is shifted over the sack-receptacle side 16 and releasably kept in place by means of a strap retain 17.

To facilitate emptying, a valve with large opening cross section can be incorporated into the sack 3. Such valves are known, for example, from inflatable-boat technology, so that no further explanation is needed here.

As a further development, the inner surface of the sack can be at least partially provided with light-reflecting zones or coloured layers, so that lighting effects can be optimized to suit the individual case. After the sack has been fixed to the sack-side-end 16 of the adapter ring 4 as described above, by means of a profiled seal 5 and strap retain 17, and the compressed-gas connection 6 has been attached by way of appropriate flexible tubes to a compressed-gas tank or generator, e.g. a compressor, the filling process can be initited by actuating the electronic valve. When a preset final pressure level has been reached, the supply of gas is automatically switched off and in the exemplary embodiment the event is signalled optically and/or acoustically.

It is obviously possible while the light diffuser is in operation to monitor the internal pressure or a declining pressure gradient and to signal it, preferably by optical means, so that a pause in the photography can be utilized to replenish the contents of the associated diffuser.

In another embodiment of the invention the adapter ring is provided with a valve having a large opening cross section, or with a screw opening. This valve or opening assists rapid emptying of the sack, but can also be used for preliminary filling by means of a blower that can be connected thereto.

So that the sack can be securely attached, it is possible to provide it on the inside and outside of its opening end with a strip-like elastic ring, which in cooperation with the retaining ring or strap retain ensures that the sack is tightly pressed against the region of the adapter ring 4.

A switching device can be used not only for providing several light diffusers with compressed air in sequence, but also as a central system for the electrical control of the valves as well as for monitoring the pressure by way of a pressure indicator. In particular for the case in which several light diffusers are being operated, an electrical remote control unit can be constructed that comprises a preferably optical signal unit, e.g. in the form of a LED. A change in the colour of the display can indicate whether the pressure in the attached light diffusers or air sacks has fallen below a set point, so that during the next pause in the photography refilling can be carried out by actuating the electronic valve. In a practical example it has been found that with respect to both the compressed-air and the electrical side, up to ten light diffusers arranged in series can be operated and monitored. Altogether, the light diffuser presented here makes it possible, in a particularly simple and reliable way, to fill an air sack attached to a corresponding adapter ring with no need for elaborate means of monitoring the filling process at the site of the photography.

While a particular embodiment of the invention has been shown and described, changes and modifications may be made therein without departing from the invention in its broader aspects, and, therefore, the aim in the appended claims is to cover all such changes and modifications as fall within the true spirit and scone of the invention.

What is claimed is:

1. Light diffuser, consisting of a holding mechanism and, releasably connected thereto, an inflatable sack that is at least partially translucent, wherein the holding mechanism comprises an adapter ring that at one end serves for attachment to a spotlight and at the other end as a receptacle of the sack, and furthermore the adapter ring is closed off at the attachment end so as to be translucent and pressure-sealed, and at the holding mechanism means are provided for the supply of a gaseous filling medium, characterized in that at the adapter ring there are arranged a compressed-gas connection as well as an electronically actuatable valve for the gas supply, such that a first pressure sensor determines the increasing of pressure within the sack fixed to the ring and sends a switch-off signal to the valve when a preset maximal pressure has been reached, in order to terminate or interrupt filling automatically.

2. Light diffuser according to claim 1, characterized in that a second sensor is provided to detect the ambient pressure, so that a switch-off signal can be derived on the basis of a preset differential pressure value.

3. Light diffuser according to claim 1 or 2, characterized in that the electronic relay valve can be manually actuated by way of a key button for the gas-filling or gas-replenishing.

4. Light diffuser according to claim 1, characterized in that at the adapter ring an additional compressed-gas connection is provided, so that several light diffusers can be connected in series.

5. Light diffuser according to claim 1, characterized in that the compressed-gas connection or connections can be connected by way of flexible pressure tubing to a compressor that can be situated some distance away.

6. Light diffuser according to claim 5, characterized in that by way of the compressor and by means of actuation of the key button or buttons, filling and replenishing of the sack, or of the sacks in the case of several light diffusers results.

7. Light diffuser according to claim 5, characterized in that after the compressor has been switched to suction operation and the valve has been actuated, rapid emptying of the filled sacks results.

8. Light diffuser according to claim 1, characterized in that the compressed-gas connection or connections is/are connected by way of flexible pressure tubing to a gas accumulator tank.

9. Light diffuser according to claim 1, characterized in that at the air sack an exhaust valve with large opening cross section is provided.

10. Light diffuser according to claim 1, characterized in that at the sack receptacle part of the adapter ring, circumferential beads with protrusions and recesses are formed that serve to fix in position a profiled seal with corresponding surface structure, and that the sack is shifted over the profiled seal and fixed there by means of a retaining ring or strapretain.

11. Light diffuser according to claim 1, characterized in that at the adapter ring a valve or a screw opening with large opening cross section is arranged by way of which preliminary filling of the sack, preferably with a blower, and/or a rapid emptying are brought about.

12. Light diffuser according to claim 1, characterized in that on the inside and/or the outside of the attached end of the sack by which it is supported, a circumferential sealer coating is applied.

13. Light diffuser according to claim 12, characterized in that the sealer coating consists of a strip of heat-resistant elastic material, which is bonded to the sack material without a gap.

14. Light diffuser according to claim 1, characterized by a remote control unit to display the pressure and/or actuate the electronic valve.

* * * * *

UNITED STATES PATENT AND TRADEMARK OFFICE

CERTIFICATE OF CORRECTION

PATENT NO. : 6,683,719 B2 Page 1 of 1
DATED : January 27, 2004
INVENTOR(S) : Uwe Haganbach and Bernhard Grill It is certified that error appears in the above-identified patent and that said Letters Patent is hereby corrected as shown below:

Title page,
Item [30], Foreign Application Priority Data, should read
-- May 29, 2000(DE) ............... 100 26 594
June 08, 2000 (DE) ............... 100 28 357 --

Signed and Sealed this

Thirtieth Day of March, 2004

JON W. DUDAS
*Acting Director of the United States Patent and Trademark Office*